(12) United States Patent
Darga et al.

(10) Patent No.: US 8,133,624 B2
(45) Date of Patent: Mar. 13, 2012

(54) FUEL CELL MODULE DESIGN FOR ROBUST PRESSURE MEASUREMENTS IN FREEZING CONDITIONS

(75) Inventors: Daniel J. Darga, Victor, NY (US);
Mark T. Schluentz, East Rochester, NY (US); Steven L. Piedmont, Macedon, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 976 days.

(21) Appl. No.: 12/109,003

(22) Filed: Apr. 24, 2008

(65) Prior Publication Data
US 2009/0269637 A1 Oct. 29, 2009

(51) Int. Cl.
*H01M 8/04* (2006.01)
(52) U.S. Cl. ........................................ 429/429; 429/411
(58) Field of Classification Search .................. 429/411, 429/429, 440, 446
See application file for complete search history.

(56) References Cited

U.S. PATENT DOCUMENTS

| | | | |
|---|---|---|---|
| 6,413,662 B1 * | 7/2002 | Clingerman et al. | 429/429 |
| 2007/0166577 A1 * | 7/2007 | Inai et al. | 429/13 |
| 2008/0090124 A1 * | 4/2008 | Barleben et al. | 429/26 |
| 2008/0152972 A1 * | 6/2008 | Igarashi et al. | 429/22 |
| 2008/0311441 A1 * | 12/2008 | Hochgraf et al. | 429/17 |

FOREIGN PATENT DOCUMENTS

| | | |
|---|---|---|
| CN | 1971995 A | 5/2007 |
| WO | 2006134461 A1 | 12/2006 |

* cited by examiner

*Primary Examiner* — Michael Zarroli
(74) *Attorney, Agent, or Firm* — Fraser Clemens Martin & Miller LLC; J. Douglas Miller

(57) ABSTRACT

A fuel cell system is disclosed including a fuel cell stack and pressure sensors, wherein bypass conduits having flow restriction devices disposed therein are provided for bypassing fluids around the fuel cell stack to militate against the accumulation of moisture in conduits in fluid communication with the pressure sensors.

17 Claims, 2 Drawing Sheets

FUEL CELL MODULE DESIGN FOR ROBUST PRESSURE MEASUREMENTS IN FREEZING CONDITIONS

FIELD OF THE INVENTION

The invention relates to a fuel cell system, and more particularly to a fuel cell system including a fuel cell stack and pressure sensors, wherein bypass conduits having flow restriction devices disposed therein are provided for bypassing fluids around the fuel cell stack to militate against the accumulation of moisture in conduits in fluid communication with the pressure sensors.

BACKGROUND OF THE INVENTION

Fuel cell assemblies convert a fuel and an oxidant to electricity. One type of fuel cell assembly employs a proton exchange membrane (hereinafter "PEM") to facilitate catalytic reaction of fuels (such as hydrogen) and oxidants (such as air or oxygen) to generate electricity. The PEM is a solid polymer electrolyte membrane that facilitates transfer of protons from an anode to a cathode in each individual fuel cell normally deployed in the fuel cell assembly.

In a typical fuel cell assembly, individual fuel cell plates include channels through which various reactants, cooling fluids, and byproduct water formed by the reactants during operation of the assembly flow. When the fuel cell assembly is warmer than the ambient environment, water vapor in the fuel cell assembly may condense. In subzero ambient temperatures, the condensate may form ice in the fuel cell assembly. The presence of condensate and ice may affect the performance of the fuel cell assembly.

During operation of the fuel cell assembly, waste heat from the fuel cell reaction heats the assembly and militates against vapor condensation and ice formation in the assembly. However, condensate may flow through the system and accumulate in conduits throughout the fuel cell system, such as a conduit in fluid communication with a pressure sensor in the fuel cell system. Condensate blocking a fluid communication conduit to the pressure sensor may cause false pressure readings by the sensor resulting in a low reactant pressure within the fuel cell. Low reactant pressures can lead to an insufficient supply of the reactants needed to produce a required electrical output. Alternatively, false pressure readings by the sensors can result in a high reactant pressure. Pressure sensors are also susceptible to false readings when the fuel cell is operating at a subzero temperature. Frozen condensate can cause the false readings when the frozen condensate blocks communication between a reactant flow path and the sensor.

It would be desirable to develop a fuel cell system that militates against the accumulation of condensation or ice in a conduit in fluid communication with a pressure sensor, without affecting the pressure or stoichiometry of reactants flowing through a fuel cell stack of the fuel cell system.

SUMMARY OF THE INVENTION

Concordant and congruous with the present invention, a fuel cell system that militates against the accumulation of condensation or ice in a conduit in fluid communication with a pressure sensor, without affecting the pressure or stoichiometry of reactants flowing through a fuel cell stack of the fuel cell system, has surprisingly been discovered.

In one embodiment, the fuel cell system comprises a first fuel cell stack including at least a cathode inlet, a cathode outlet, an anode inlet, and an anode outlet, wherein an oxidant is caused to flow from a source of oxidant through the cathode inlet to the cathode outlet of said first fuel cell stack and a fuel is caused to flow from a source of fuel through the anode inlet to the anode outlet of said first fuel cell stack; a first bypass in fluid communication with the source of the fuel and the anode outlet; a second bypass in fluid communication with the source of the oxidant and the cathode outlet; a first pressure sensor in fluid communication with said first bypass and adapted to measure a pressure of the fuel caused to flow therethrough; and a second pressure sensor in fluid communication with said second bypass and adapted to measure a pressure of the oxidant caused to flow therethrough.

In another embodiment, the fuel cell system comprises a first fuel cell stack including at least a cathode inlet, a cathode outlet, an anode inlet, and an anode outlet, wherein an oxidant is caused to flow from a source of oxidant through the cathode inlet to the cathode outlet of said first fuel cell stack and a fuel is caused to flow from a source of fuel through the anode inlet to the anode outlet of said first fuel cell stack; a second fuel cell stack including at least a cathode inlet, a cathode outlet, an anode inlet, and an anode outlet, wherein the fuel is caused to flow from the anode outlet of said first fuel cell stack to the anode inlet of said second fuel cell stack and the oxidant is caused to flow from the source of oxidant to the cathode inlet of said second fuel cell stack; a first bypass in fluid communication with the source of fuel, the anode outlet of said first fuel cell stack, and the anode inlet of said second fuel cell stack; a second bypass in fluid communication with the source of oxidant and the cathode outlet of the first fuel cell stack and the second fuel cell stack; a first pressure sensor in fluid communication with said first bypass and adapted to measure a pressure of the fuel caused to flow therethrough, wherein a portion of the fuel is caused to flow through said first bypass past said first pressure sensor, and wherein the fuel flowing through said first bypass militates against the accumulation of moisture in said first bypass; and a second pressure sensor in fluid communication with said second bypass and adapted to measure a pressure of the oxidant caused to flow therethrough, wherein a portion of the oxidant is caused to flow through said second bypass past said second pressure sensor, and wherein the oxidant flowing through said second bypass militates against the accumulation of moisture in said second bypass.

In another embodiment, the method of operating a fuel cell system comprises the steps of providing a first fuel cell stack including at least a cathode inlet in communication with a source of oxidant, a cathode outlet, an anode inlet in communication with a source of fuel, and an anode outlet; providing a first bypass in fluid communication with the source of fuel; providing a second bypass in fluid communication with the source of oxidant; providing a first pressure sensor adapted to measure a pressure of a fuel caused to flow from the source of fuel through the first bypass, providing a second pressure sensor adapted to measure a pressure of an oxidant caused to flow from the source of oxidant through the second bypass; causing a portion of the fuel to flow through the first bypass past the first pressure sensor, wherein the fuel flowing through the first bypass militates against the accumulation of moisture in the first bypass; and causing a portion of the oxidant to flow through the second bypass past the second pressure sensor, wherein the oxidant flowing through the second bypass militates against the accumulation of moisture in the second bypass.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE EMBODIMENTS

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
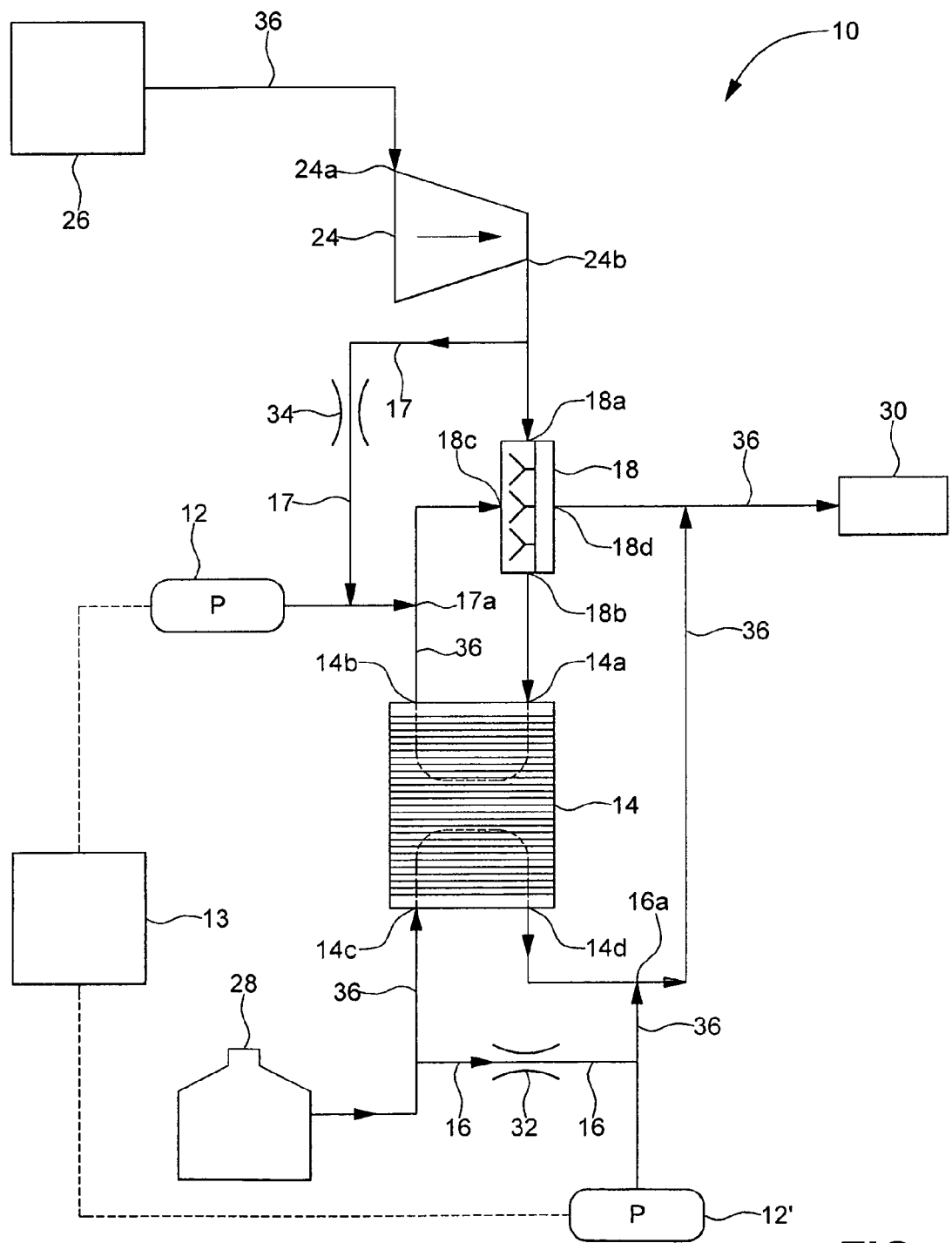
FIG. 1 is a schematic flow diagram of a fuel cell system according to an embodiment of the invention.

FIG. 1 shows a fuel cell system 10 according to an embodiment of the invention. A typical fuel cell system may include several system components including a humidifier, a compressor, an exhaust system, and a heat exchanger. Such a fuel cell system is disclosed in commonly owned U.S. patent application Ser. No. 11/684,906, hereby incorporated herein by reference in its entirety. The fuel cell system 10 includes a plurality of pressure sensors 12, 12' in fluid communication with a fuel cell stack 14, a first bypass 16, and a second bypass 17.

In the embodiment shown in FIG. 1, the pressure sensor 12 is adapted to measure a pressure of an oxidant caused to flow from a cathode side of the fuel cell stack 14, while the pressure sensor 12' is adapted to measure a pressure of a fuel caused to flow from an anode side of the fuel cell stack 14. The pressure sensor 12' is in fluid communication with the first bypass 16 which is in fluid communication with a fuel source 28. The pressure sensor 12 is in fluid communication with the second bypass 17 which is in fluid communication with a humidifier 18. The humidifier 18 is in further fluid communication with a source of oxidant 26. Both of the pressure sensors 12, 12' are in electrical communication with a controller 13. The controller 13 is adapted to provide a signal or data indicative of the pressure measurements from the sensors 12, 12' to a computer or an operator so that the fluid flows may be adjusted to maintain an optimal operation of the fuel cell stack 14. The controller 13 may be any device adapted to receive a signal generated by the pressure sensors 12, 12' such as a programmable logic controller (PLC), for example. It is understood that the oxidant may be any fluid containing oxygen such as air, for example. The fuel may be any fuel such as hydrogen, for example.

The humidifier 18 is a water vapor transfer unit adapted to humidify the oxidant prior to entering the fuel cell stack 14. The water vapor transfer unit includes a dry side and a wet side, separated by a water vapor permeable membrane (not shown) or the like. The dry side has an inlet 18a and an outlet 18b, and the wet side has an inlet 18c and an outlet 18d. The inlet 18a is in fluid communication with a compressor 24. The outlet 18b is in fluid communication with a cathode inlet 14a of the fuel cell stack 14. The inlet 18c is in fluid communication with a cathode outlet 14b of the fuel cell stack 14 and the second bypass 17. The outlet 18d is in fluid communication with an exhaust system 30.

The compressor 24 includes an inlet 24a and an outlet 24b. The inlet 24a of the compressor 24 is in fluid communication with the source of oxidant 26, and the outlet 24b of the compressor 24 is in fluid communication with the inlet 18a of the humidifier 18 and the second bypass 17. The source of oxidant 26 is typically a source of air. It is understood that the source of oxidant 26 may be an oxygen storage tank or the atmosphere, for example, as desired. The compressor 24 may be any conventional compressor such as a centrifugal air compressor, a turbomachine, a centrifugal compressor, a mixed flow compressor, a blower, and a fan, for example.

The fuel cell stack 14 includes a stack of fuel cells. It is understood that the number of fuel cells in the fuel cell stack 14 may vary. Each fuel cell of the fuel cell stack 14 has a membrane electrode assembly (MEA) separated by an electrically conductive bipolar plate. The MEAs and bipolar plates are stacked together between clamping plates or end plates and end contact elements. The end contact elements and bipolar plates contain a plurality of grooves or channels for distributing the fuel and the oxidant gases to the MEAs.

The fuel cell stack 14 includes the cathode inlet 14a, the cathode outlet 14b, an anode inlet 14c, and an anode outlet 14d. The cathode inlet 14a is in fluid communication with the outlet 18b of the humidifier 18. The cathode outlet 14b is in fluid communication with the inlet 18c of the humidifier 18 and the second bypass 17. The anode inlet 14c is in fluid communication with the fuel source 28. The anode outlet 14d is in fluid communication with the exhaust system 30 and the first bypass 16. The number of inlets and outlets in the fuel cell stack 14 may vary based on the size of the fuel cell stack 14 in use, the amount of outlet energy required from the fuel cell stack 14, and other design considerations. It is understood that the fuel source 28 may be a hydrogen storage tank or other system component, for example. It is also understood that the anode outlet 14d may be in fluid communication with the atmosphere, another fuel cell stack (not shown), or other system component, as desired.

The first bypass 16 is a conduit providing a flow of a desired amount of fluid from the fuel source 28, to the pressure sensor 12', and to the exhaust system 30, thereby bypassing the fuel cell stack 14. The first bypass 16 may include a flow restriction device 32 adapted to restrict the flow of fluid therethrough. It is understood that the flow restriction device 32 may be any device adapted to restrict the flow of a fluid such as an orifice cap and an orifice spud, for example.

The second bypass 17 is a conduit providing a flow of a desired amount of fluid from the outlet 24b of the compressor 24, to the pressure sensor 12, and to the inlet 18c of the humidifier 18, thereby bypassing a humidification in the humidifier 18 and the fuel cell stack 14. The second bypass 17 may include a flow restriction device 34 adapted to restrict the flow of fluid therethrough. It is understood that the flow restriction device 34 may be any device adapted to restrict the flow of a fluid such as an orifice cap and an orifice spud, for example.

In use, hydrogen gas is caused to flow from the fuel source 28 through the conduit 36 to the anode inlet 14c of the fuel cell stack 14. A portion of the hydrogen gas from the fuel source 28 is caused to flow through the first bypass 16 to the pressure sensor 12' and then to the exhaust system 30. The humidity of the hydrogen flowing through the bypass 16 to the pressure sensor 12' is minimized because the humidification of the hydrogen by the product water formed in the fuel cell stack 14 as the hydrogen flows therethrough is bypassed. A pressure measured by the pressure sensor 12' is substantially equal to the pressure of the fluid from the anode outlet 14d of the fuel cell stack 14 because the flow of hydrogen gas through the first bypass 16 is a fluid flow parallel to the primary hydrogen gas flow through the fuel cell stack 14 that begins at the anode inlet 14c and ends at the anode outlet 14d. The flow restriction device 32 disposed in the first bypass 16 introduces a restriction to the flow of the hydrogen gas therethrough, thereby causing a pressure drop. The size of the flow restriction device 32 is optimized to minimize the flow of hydrogen gas though the first bypass 16 to ensure that the amount of hydrogen gas caused to flow therethrough does not significantly reduce the stoichiometry of the reactants caused to flow through the fuel cell stack 14. Because a portion of the first bypass 16 is disposed between the pressure sensor 12' and the conduit 36 in communication with the exhaust system 30, the size of the flow restriction device 32 is optimized to account for the pressure drop across the portion of conduit of the first bypass 16 after the pressure sensor 12' to maximize the accuracy of the pressure measurement by the pressure sensor 12'.

The hydrogen flowing through the anode outlet 14d of the fuel cell stack 14 may contain product water generated by the reaction therein. Accordingly, water may accumulate at a junction 16a of the bypass conduit 16 and from the anode outlet 14d through the conduit 36 to the exhaust system 30. The accumulation of moisture at the junction 16a may block the flow of the dry fluid through the bypasses 16. However, the hydrogen gas caused to flow through the first bypass 16 militates against the accumulation of moisture in the first bypass 16 by creating a continuous flow of fluid therethrough. The continuous flow of the dry fluid militates against an inflow of humidified fluid. Because moisture may accumulate at the junction 16a when fluid is not flowing through the first bypass 16, such as when the fuel cell assembly 10 is powered down, the fluid flowing through the bypass conduit 16 will evaporate the moisture when the fluid is again caused to flow therethrough, thereby militating against the accumulation of moisture therein.

Simultaneous to the flow of hydrogen gas through the fuel cell assembly 10, air is caused to flow from the source of oxidant 26 and through the conduit 36 to the inlet 24a of the compressor 24. In the compressor 24, the volume of the air is reduced, thereby increasing the pressure thereof. A portion of the air from the outlet 24b of the compressor 24 flows to the first inlet 18a of the humidifier 18 and through the dry side of the humidifier 18 for humidification thereof. In the humidifier 18, air having a higher moisture content than the air flowing through the dry side is caused to flow through the wet side. Water vapor is transferred through the membrane to the air flowing through the dry side. The air in the wet side is caused to flow through the second outlet 18d of the humidifier 18 and to the exhaust system 30. The air in the dry side is caused to flow through the first outlet 18b to the cathode inlet 14a of the fuel cell stack 14.

Another portion of the air from the outlet 24b of the compressor 24 is caused to flow through the second bypass 17 to the pressure sensor 12 and then to the second inlet 18c of the humidifier 18. The humidity of the air flowing through the second bypass 17 to the pressure sensor 12 is minimized because the humidifier 18 is bypassed, thereby bypassing humidification of the air therein. A pressure measured by the pressure sensor 12 is substantially equal to the pressure of the fluid from the cathode outlet 14b of the fuel cell stack 14 because the flow of air through the second bypass 17 is a fluid flow parallel to the primary air flow through the fuel cell stack 14 that begins at the cathode inlet 14a and ends at the cathode outlet 14b. The flow restriction device 34 disposed in the second bypass 17 introduces a restriction to the flow of the air therethrough, thereby causing a pressure drop. The size of the flow restriction device 34 is optimized to minimize the flow of air though the second bypass 17 to ensure that the amount of air caused to flow therethrough does not significantly reduce the stoichiometry of the reactants caused to flow through the fuel cell stack 14. Because a portion of the second bypass 17 is disposed between the pressure sensor 12 and the conduit 36, the size of the flow restriction device 34 is optimized to account for the pressure drop across the portion of conduit of the second bypass 17 after the pressure sensor 12 to maximize the accuracy of the pressure measurement by the pressure sensor 12.

The air flowing through the cathode side of the fuel cell stack 14 is humidified in the humidifier 18 prior to entering the fuel cell stack 14. The air exiting the cathode outlet 14b of the fuel cell stack 14 may contain product water generated by reaction therein. Accordingly, water may accumulate at a junction 17a of the bypass conduit 17 and the conduit 36 to the wet side of the humidifier 18. The accumulation of moisture at the junction 17a may block the flow of the dry fluid through the second bypasses 17. However, the air caused to flow through the second bypass 17 militates against the accumulation of moisture in the second bypass 17 by creating a continuous flow of air therethrough. The continuous flow of the dry fluid militates against an inflow of humidified fluid. Because moisture may accumulate at the junction 17a when a dry fluid is not flowing through the second bypass 17, such as when the fuel cell assembly 10 is powered down, the fluids flowing through the second bypass conduit 17 will evaporate the moisture when the fluids are again caused to flow therethrough, thereby militating against the accumulation of moisture therein.

The pressure measurement by the pressure sensor 12 and the pressure measurement by the pressure sensor 12' are electrically communicated to the controller 13. The controller 13 compares the pressure measurements from the sensors 12, 12' and provides a signal or data indicative of the pressure measurements to a computer or an operator so that the reactant fluid flows may be adjusted to maintain the stoichiometry of reactants in the fuel cell stack 14 and to maintain an optimal operation of the fuel cell stack 14.

In the fuel cell stack 14, the oxygen in the air electrochemically reacts with the hydrogen to generate power to drive a vehicle or other system as is known in the art. Unreacted hydrogen is caused to flow out of the fuel cell stack 14, through the anode outlet 14d, and to the exhaust system 30. Unreacted oxygen is caused to flow through the cathode outlet 14b to the atmosphere.

Figure 2:
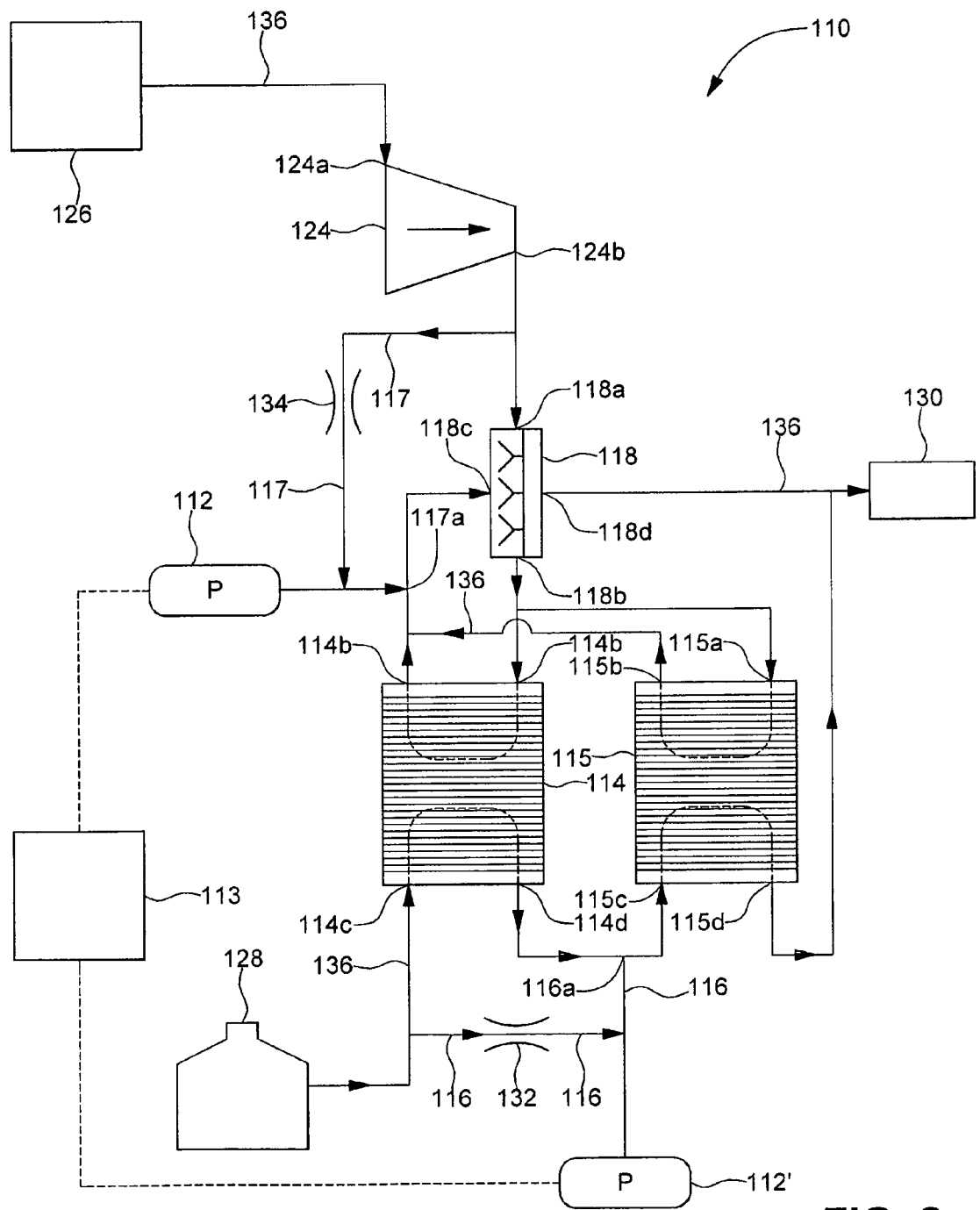
FIG. 2 is a schematic flow diagram of a fuel cell system according to another embodiment of the invention.

FIG. 2 shows a fuel cell system 110 according to another embodiment of the invention. The fuel cell system 110 includes a pressure sensor 112 in fluid communication with a first fuel cell stack 114, a second fuel cell stack 115, a first bypass 116, and a second bypass 117.

In the embodiment shown in FIG. 2, the pressure sensor 112 is adapted to measure a pressure of an oxidant caused to flow from a cathode side of the fuel cell stack 114, while the pressure sensor 112' is adapted to measure a pressure of a fuel caused to flow from an anode side of the fuel cell stack 114. The pressure sensor 112' is in fluid communication with the first bypass 116 which is in fluid communication with a fuel source 128 and an anode outlet 114d of the first fuel cell stack 114. The pressure sensor 112 is in fluid communication with the second bypass 117 which is in fluid communication with a compressor 124 and a humidifier 118. Both of the pressure sensors 112, 112' are in electrical communication with a controller 113. The controller 113 is adapted to provide a signal or data indicative of the pressure measurements from the sensors 112, 112' to a computer or an operator so that the fluid flows may be adjusted to maintain an optimal operation of the fuel cell stacks 114, 115. The controller 113 may be any device adapted to receive a signal generated by the pressure sensors 112, 112' such as a PLC, for example. It is understood that the oxidant may be any fluid containing oxygen such as air, for example. The fuel may be any fuel such as hydrogen, for example.

The humidifier 118 is a water vapor transfer unit adapted to humidify the oxidant prior to entering the first fuel cell stack 114. The water vapor transfer unit includes a dry side and a wet side, separated by a water vapor permeable membrane (not shown) or the like. The dry side has an inlet 118a and an outlet 118b, and the wet side has an inlet 118c and an outlet 118d. The inlet 118a is in fluid communication with the compressor 124. The outlet 118b is in fluid communication with a cathode inlet 114a of the first fuel cell stack 114 and a cathode inlet 115a of the second fuel cell stack 115. The inlet 118c is in fluid communication with the bypass conduit 117, a cathode outlet 114b of the first fuel cell stack 114, and a cathode outlet 115b of the second fuel cell stack 115. The outlet 118d is in fluid communication with the exhaust system 130.

The compressor 124 includes an inlet 124a and an outlet 124b. The inlet 124a of the compressor 124 is in fluid communication with the source of oxidant 126, and the outlet 124b of the compressor 124 is in fluid communication with the inlet 120a of the humidifier 118 and the second bypass 117. The source of oxidant 126 is typically a source of air. It is understood that the source of oxidant 126 may be an oxygen storage tank or the atmosphere, for example, as desired. The compressor 124 may be any conventional means for compressing a fluid such as a centrifugal air compressor, a turbomachine, a centrifugal compressor, a mixed flow compressor, a blower or a fan, for example.

The fuel cell stacks 114, 115 each include a stack of fuel cells, as previously discussed herein. It is understood that the number of fuel cells in the fuel cell stacks 114, 115 may vary. Each fuel cell of the fuel cell stacks 114, 115 has a membrane electrode assembly MEAs (not shown) separated by an electrically conductive bipolar plate (not shown). The MEAs and bipolar plates are stacked together between clamping plates or end plates (not shown) and end contact elements (not shown). The end contact elements and bipolar plates contain a plurality of grooves or channels for distributing the fuel and the oxidant.

The first fuel cell stack 114 includes the cathode inlet 114a, the cathode outlet 114b, an anode inlet 114c, and the anode outlet 114d. The cathode inlet 114a is in fluid communication with the outlet 118b of the humidifier 118. The cathode outlet 114b is in fluid communication with the inlet 118c of the humidifier 118 and the pressure sensor 112. The anode inlet 114c is in fluid communication with a hydrogen source 128 and the first bypass 116. The anode outlet 114d is in fluid communication with an anode inlet 115c of the second fuel cell stack 115 and the pressure sensor 112. The number of inlets and outlets in the first fuel cell stack 114 may vary based on the size of the stack in use, the amount of outlet energy required from the stack, and other design considerations. It is understood that the hydrogen source 128 may be a fuel tank or other system component, for example, as desired.

The second fuel cell stack 115 includes the cathode inlet 115a, the cathode outlet 115b, the anode inlet 15c, and an anode outlet 115d. The cathode inlet 115a is in fluid communication with the outlet 118b of the humidifier 118. The cathode outlet 115b is in fluid communication with the inlet 118c of the humidifier 118. The anode inlet 115c is in fluid communication with the anode outlet 114d of the first fuel cell stack 114 and the first bypass 116. The anode outlet 115d is in fluid communication with the exhaust system 130. The number of inlets and outlets in the second fuel cell stack 115 may vary based on the size of the stack in use, the amount of outlet energy required from the stack, and other design considerations. It is understood that the anode outlet 115d may be in fluid communication with the atmosphere, another fuel cell stack (not shown), or other system component, as desired.

The first bypass 116 is a conduit providing a flow of a desired amount of fluid from the hydrogen source 128 to the pressure sensor 112', thereby bypassing the first fuel cell stack 114. The first bypass 116 may include a flow restriction device 132 adapted to restrict the flow of fluid therethrough. It is understood that the flow restriction device 132 may be any device adapted to restrict the flow of a fluid such as an orifice spud, for example, as desired.

The second bypass 117 is a conduit providing a flow of a desired amount of fluid from the compressor 124 to the pressure sensor 112, thereby bypassing a humidification in the humidifier 118 and the fuel cell stacks 114,115. The second bypass 117 may include a flow restriction device 134 adapted to restrict the flow of fluid therethrough. It is understood that the flow restriction device 134 may be any device adapted to restrict the flow of a fluid such as an orifice spud, for example, as desired.

In use, hydrogen gas is caused to flow from the hydrogen source 128 through the conduit 136 to the anode inlet 114c of the first fuel cell stack 114. A portion of the hydrogen gas from the fuel source 128 is caused to flow through the first bypass 116 to the pressure sensor 112' and to the anode inlet 115c of the second fuel cell stack 115. The humidity of the hydrogen flowing through the bypass 116 to the pressure sensor 112' is minimized because the humidification of the hydrogen by the product water formed in the first fuel cell stack 114 as the hydrogen flows therethrough is bypassed. A pressure measured by the pressure sensor 112' is substantially equal to the pressure of the fluid from the anode outlet 114d of the first fuel cell stack 114 because the flow of hydrogen gas through the first bypass 116 is a fluid flow parallel to the primary hydrogen gas flow through the first fuel cell stack 114 that begins at the anode inlet 114c and ends at the anode outlet 114d. The flow restriction device 132 disposed in the first bypass 116 introduces a restriction to the flow of the hydrogen gas therethrough, thereby causing a pressure drop. The size of the flow restriction device 132 is optimized to minimize the flow of hydrogen gas though the first bypass 116 to ensure that the amount of hydrogen gas caused to flow therethrough does not significantly reduce the stoichiometry of the reactants caused to flow through the first fuel cell stack 114. Because a portion of the first bypass 116 is disposed between the pressure sensor 112' and the conduit 136, the size of the flow restriction device 132 is optimized to account for the pressure drop across the portion of conduit of the first bypass 116 after the pressure sensor 112' to maximize the accuracy of the pressure measurement by the pressure sensor 112'

The hydrogen flowing from the anode outlet 114d of the first fuel cell stack 114 may contain product water generated by the reaction therein. Accordingly, water may accumulate at a junction 116a of the bypass conduit 116 and from the anode outlet 114d through the conduit 136 to the exhaust system 130. The accumulation of moisture at the junction 116a may block the flow of the dry fluid through the bypasses 116. However, the hydrogen gas caused to flow through the first bypass 116 militates against the accumulation of moisture in the first bypass 116 by creating a continuous flow of fluid therethrough. The continuous flow of the dry fluid militates against an inflow of humidified fluid. Because moisture may accumulate at the junction 116a when dry fluids are not flowing through the first bypass 116, such as when the fuel cell assembly 110 is powered down, the fluids flowing through the bypass conduit 116 will evaporate the moisture when the fluids are again caused to flow therethrough, thereby militating against the accumulation of moisture therein.

Simultaneous to the flow of hydrogen gas through the first fuel cell stack 114, air is caused to flow from the source of oxidant 126 and through the conduit 136 to the inlet 124a of the compressor 124. In the compressor 124, the volume of the air is reduced, thereby increasing the pressure thereof. A portion of the air from the outlet 124b of the compressor 124 flows to the first inlet 118a of the humidifier 118 and through the dry side of the humidifier 118 for humidification thereof. In the humidifier 118, air having a higher moisture content than the air flowing through the dry side is caused to flow through the wet side. Water vapor is transferred through the membrane to the air flowing through the dry side. The air in the wet side is caused to flow through the second outlet 118d of the humidifier 118 and to the exhaust system 130. The air in the dry side is caused to flow through the first outlet 118b to the cathode inlet 114a of the first fuel cell stack 114.

Another portion of the air from the outlet 124b of the compressor 124 is caused to flow through the second bypass 117, to the pressure sensor 112, and to the second inlet 118c of the humidifier 118. The humidity of the air flowing through the second bypass 117 to the pressure sensor 112 is minimized because the humidifier 118 and the stacks 114,115 are bypassed, thereby bypassing humidification of the air therein. A pressure measured by the pressure sensor 112 is substantially equal to the pressure of the fluid from the cathode outlets 114b, 115b of the fuel cell stacks 114, 115 because the flow of air through the second bypass 117 is a fluid flow parallel to the primary air flow through the fuel cell stacks 114, 115 that begins at the cathode inlets 114a, 115a and ends at the cathode outlets 114b, 114b. The flow restriction device 134 disposed in the second bypass 117 introduces a restriction to the flow of the air therethrough, thereby causing a pressure drop. The size of the flow restriction device 134 is optimized to minimize the flow of air though the second bypass 117 to ensure that the amount of air caused to flow therethrough does not significantly reduce the stoichiometry of the reactants caused to flow through the fuel cell stacks 114, 115. Because a portion of the second bypass 117 is disposed between the pressure sensor 112 and the conduit 136, the size of the flow restriction device 134 is optimized to account for the pressure drop across the portion of conduit of the second bypass 117 after the pressure sensor 112 to maximize the accuracy of the pressure measurement by the pressure sensor 112.

The air flowing through the cathode side of the fuel cell stacks 114, 115 is humidified in the humidifier 118 prior to entering the fuel cell stacks 114, 115. The air exiting the cathode outlets 114b, 115b of the fuel cell stacks 114, 115 may contain product water generated by reaction therein. Accordingly, water may accumulate at a junction 117a of the bypass conduit 117 and the conduit 136 to the wet side of the humidifier 118. The accumulation of moisture at the junction 117a may block the flow of the dry fluid through the second bypasses 117. However, the air caused to flow through the second bypass 117 militates against the accumulation of moisture in the second bypass 117 by creating a continuous flow of air therethrough. The continuous flow of the dry fluid militates against an inflow of humidified fluid. Because moisture may accumulate at the junction 117a when a dry fluid is not flowing through the second bypass 117, such as when the fuel cell assembly 110 is powered down, the fluids flowing through the second bypass conduit 117 will evaporate the moisture when the fluids are again caused to flow therethrough, thereby militating against the accumulation of moisture therein.

The pressure measurement by the pressure sensor 112 and the pressure measurement by the pressure sensor 112' are electrically communicated to the controller 113. The controller 113 compares the pressure measurements from the sensors 112, 112' and provides a signal or data indicative of the pressure measurements to a computer or an operator so that the reactant fluid flows may be adjusted to maintain the stoichiometry of reactants in the fuel cell stacks 114, 115 and to maintain an optimal operation of the fuel cell stack 114, 115.

In the first fuel cell stack 114, the oxygen in the air electrochemically reacts with the hydrogen to generate power to drive a vehicle or other system as is known in the art. Unreacted hydrogen is caused to flow out of the first fuel cell stack 114, through the anode outlet 114d, and to the anode inlet 115c of the second fuel cell stack 115. Unreacted oxygen is caused to flow through the cathode outlet 114b, through the conduit 136, to the second inlet 118c, and through the humidifier 118 to the exhaust system 130.

In the second fuel cell stack 115, the oxygen in the air electrochemically reacts with the hydrogen to generate power to drive a vehicle or other system as is known in the art. Unreacted hydrogen is caused to flow out of the second fuel cell stack 115, through the anode outlet 115d, and to the exhaust system 130. Unreacted oxygen is caused to flow through the cathode outlet 115b, through the conduit 136, to the second inlet 118c, and through the humidifier 118 to the exhaust system 130.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a first fuel cell stack including at least a cathode inlet, a cathode outlet, an anode inlet, and an anode outlet, wherein an oxidant is caused to flow from a source of oxidant through the cathode inlet to the cathode outlet of said first fuel cell stack and a fuel is caused to flow from a source of fuel through the anode inlet to the anode outlet of said first fuel cell stack;
a first bypass in fluid communication with the source of the fuel and the anode outlet;
a second bypass in fluid communication with the source of the oxidant and the cathode outlet;
a first pressure sensor adapted to measure a pressure of the fuel caused to flow through the first bypass; and
a second pressure sensor adapted to measure a pressure of the oxidant caused to flow through the second bypass.

2. The fuel cell system of claim 1, further comprising a second fuel cell stack including at least a cathode inlet, a cathode outlet, an anode inlet, and an anode outlet, wherein the fuel is caused to flow from the anode outlet of said first fuel cell stack and to the anode inlet of said second fuel cell stack and the oxidant is caused to flow from the source of oxidant to the cathode inlet of said second fuel cell stack.

3. The fuel cell system of claim 1, further comprising a flow restriction device disposed in said first bypass adapted to restrict a flow of the fuel through said first bypass.

4. The fuel cell system of claim 1, further comprising a flow restriction device disposed in said second bypass and adapted to restrict a flow of the oxidant through said second bypass.

5. The fuel cell system of claim 1, wherein the oxidant is air comprising oxygen and the fuel is hydrogen.

6. The fuel cell system of claim 1, further comprising a humidifier in fluid communication with the source of oxidant and said first fuel cell stack, wherein said humidifier is adapted to humidify the oxidant.

7. The fuel cell system of claim 6, wherein said humidifier is a water vapor transfer unit.

8. The fuel cell system of claim 6, further comprising a compressor in fluid communication with the source of oxidant and said humidifier, wherein said compressor is adapted to minimize a volume of the oxidant from the source of oxidant to increase the pressure thereof to provide a flow of the oxidant to maintain a desired stoichiometry at the cathode inlet of said first fuel cell stack.

9. The fuel cell system of claim 1, further comprising a controller in communication with said first pressure sensor and second pressure sensor.

10. A fuel cell system comprising:
a first fuel cell stack including at least a cathode inlet, a cathode outlet, an anode inlet, and an anode outlet, wherein an oxidant is caused to flow from a source of oxidant through the cathode inlet to the cathode outlet of said first fuel cell stack and a fuel is caused to flow from a source of fuel through the anode inlet to the anode outlet of said first fuel cell stack;
a second fuel cell stack including at least a cathode inlet, a cathode outlet, an anode inlet, and an anode outlet, wherein the fuel is caused to flow from the anode outlet of said first fuel cell stack to the anode inlet of said second fuel cell stack and the oxidant is caused to flow from the source of oxidant to the cathode inlet of said second fuel cell stack;
a first bypass in fluid communication with the source of fuel, the anode outlet of said first fuel cell stack, and the anode inlet of said second fuel cell stack;
a second bypass in fluid communication with the source of oxidant and the cathode outlets of said first fuel cell stack and said second fuel cell stack;
a first pressure sensor adapted to measure a pressure of the fuel caused to flow through the first bypass, wherein a portion of the fuel is caused to flow through said first bypass past said first pressure sensor, and wherein the fuel flowing through said first bypass militates against the accumulation of moisture in said first bypass; and
a second pressure sensor adapted to measure a pressure of the oxidant caused to flow through the second bypass, wherein a portion of the oxidant is caused to flow through said second bypass past said second pressure sensor, and wherein the oxidant flowing through said second bypass militates against the accumulation of moisture in said second bypass.

11. The fuel cell system of claim 10, further comprising a flow restriction device disposed in said first bypass adapted to restrict the flow of the fuel through said first bypass.

12. The fuel cell system of claim 10, further comprising a flow restriction device disposed in said second bypass adapted to restrict the flow of the oxidant through said second bypass.

13. The fuel cell system of claim 10, wherein the oxidant is air comprising oxygen and the fuel is hydrogen.

14. The fuel cell system of claim 10, further comprising a humidifier in fluid communication with the source of oxidant, said first fuel cell stack, and said second fuel cell stack, wherein said humidifier is adapted to humidify the oxidant.

15. The fuel cell system of claim 14, wherein said humidifier is a water vapor transfer unit.

16. The fuel cell system of claim 14, further comprising a compressor in fluid communication with the source of oxidant and said humidifier, wherein said compressor is adapted to minimize a volume of the oxidant from the source of oxidant to increase the pressure thereof to provide a flow of the oxidant to maintain a desired stoichiometry at the cathode inlet of said first fuel cell stack.

17. The fuel cell system of claim 10, further comprising a controller in communication with said first pressure sensor and second pressure sensor.

* * * * *